United States Patent
Rupp et al.

(10) Patent No.: US 11,933,423 B2
(45) Date of Patent: Mar. 19, 2024

(54) METHOD FOR DETERMINING A SWITCHING POINT OF A SOLENOID VALVE

(71) Applicant: Robert Bosch GmbH, Stuttgart (DE)

(72) Inventors: Andreas Rupp, Marbach (DE); Bastian Reineke, Paderborn (DE); Paul Herrmann, Gemmrigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 347 days.

(21) Appl. No.: 17/451,120

(22) Filed: Oct. 15, 2021

(65) Prior Publication Data

US 2022/0128170 A1 Apr. 28, 2022

(30) Foreign Application Priority Data

Oct. 20, 2020 (DE) ...................... 10 2020 213 203.8

(51) Int. Cl.
 *F16K 37/00* (2006.01)
 *F16K 31/06* (2006.01)

(52) U.S. Cl.
 CPC .......... *F16K 37/0041* (2013.01); *F16K 31/06* (2013.01)

(58) Field of Classification Search
 CPC ...... F16K 37/0041; F16K 31/06; F02D 41/20; F02D 2041/2055; F02D 2041/2058; F02D 41/3005; H01F 7/1844; F02M 51/061
 See application file for complete search history.

(56) References Cited

U.S. PATENT DOCUMENTS 5,880,920 A * 3/1999 Fischer ................... F02D 41/20
 361/160

FOREIGN PATENT DOCUMENTS

| DE | 4322199 A1 | 1/1995 | |
|---|---|---|---|
| DE | 102016219189 A1 | 4/2018 | |
| EP | 1319807 A1 * | 6/2003 | ............... F01L 9/04 |
| EP | 3385528 B1 * | 10/2020 | ............. F02D 41/20 |
| JP | 4535193 B2 * | 9/2010 | ........... H01F 7/1844 |
| JP | 5975899 B2 | 8/2016 | |

* cited by examiner

*Primary Examiner* — Mohamad A Musleh
(74) *Attorney, Agent, or Firm* — NORTON ROSE FULBRIGHT US LLP; Gerard A. Messina

(57) ABSTRACT

A method for determining a switching point of a solenoid valve. A solenoid coil is energized to raise a solenoid armature to unblock a flow opening. For a signal profile characteristic of a current profile in the solenoid coil, multiple periods each different from one another and each having the same predefined temporal length are determined. Within each period, a minimal and a maximal value of the signal profile and associated points in time are ascertained and a product of a difference between the maximal and minimal value and a difference between the associated points in time are ascertained. On the basis of the points in time of the minimal and maximal value of that period, which corresponds to a maximal value of the product, the switching point is determined.

10 Claims, 3 Drawing Sheets

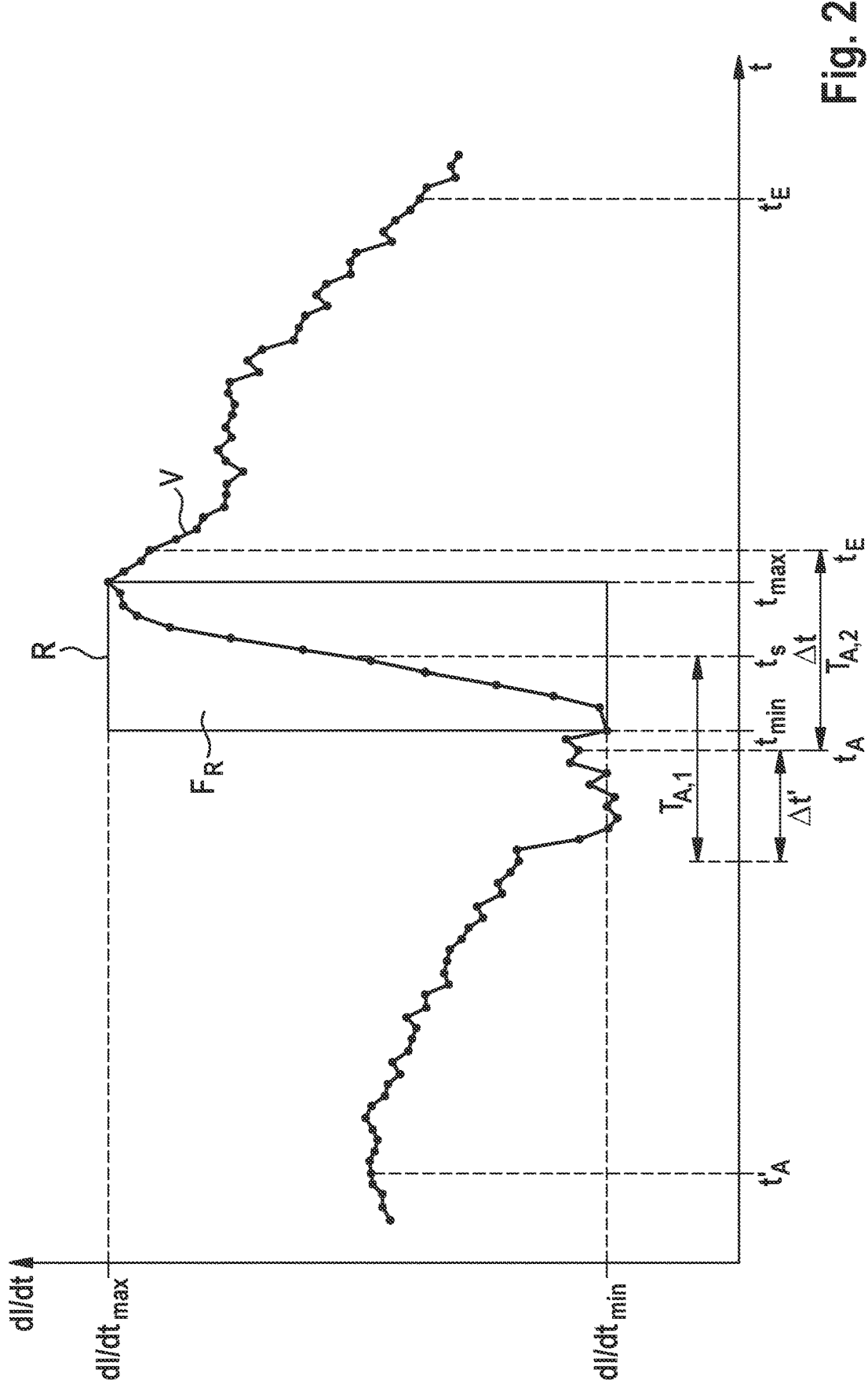

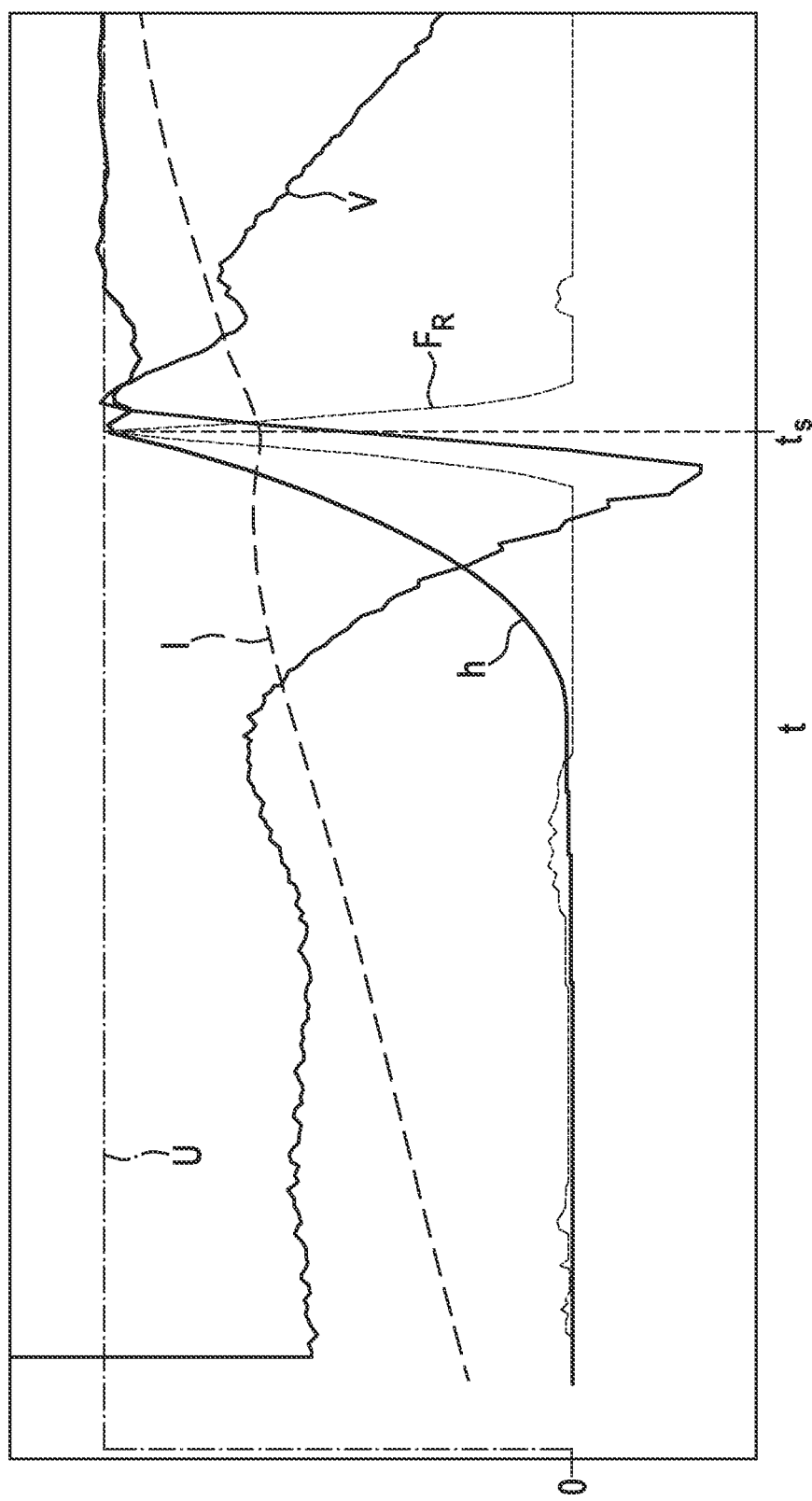

METHOD FOR DETERMINING A SWITCHING POINT OF A SOLENOID VALVE

FIELD

The present invention relates to a method for determining a switching point of a solenoid valve and a processing unit and a computer program for carrying out the method.

BACKGROUND INFORMATION

Solenoid valves include a solenoid coil and a solenoid armature, which is raised or lifted by energizing the coil—a certain voltage is typically applied for this purpose—and a flow opening is thus unblocked. A typical use of solenoid valves is in fuel injectors. The solenoid valve may typically be used there to unblock or close a flow opening for fuel.

SUMMARY

According to the present invention, a method for determining a switching point of a solenoid valve as well as a processing unit and a computer program for carrying out the method are provided. Advantageous embodiments of the present invention are described herein.

The present invention relates to determining a switching point of a solenoid valve, as was already explained at the outset. The knowledge of the activation points in time, which indicate the application or removal of a voltage to or from the solenoid coil, generally does not permit inferences about the point in time at which the flow opening is actually unblocked—the switching point. This is because, for example, a current flow first has to build up in the solenoid coil or also because the resistance which the magnet armature has to overcome due to the fluid present may vary, for example, depending on the pressure or strength of the spring in the solenoid valve. In contrast, the switching point may be recognized on the basis of the current profile through the solenoid coil, since the movement of the armature results in a steeper increase or kink in the current profile.

For the evaluation, for example, a second time derivative of the current profile may be formed, since such an increase may hereby be found as a zero point. Only the first time derivative may similarly be formed, which is then searched for a maximum in the curve. In the final effect, however, this also means a second differentiation of the current profile. However, since upon the differentiation of a signal such as that of the current profile interferences in the signal or interferences which overlay the actual signal are also differentiated, this may result in a poor quality of the signal ultimately to be evaluated and thus in incorrect identifications. In such a procedure, there are also a large number of parameters which have to be set to obtain the most accurate possible result. This makes the application to the specific case difficult.

Within the scope of the present invention, it is provided for a signal profile characteristic of a current profile in the solenoid coil, the first time derivative of the current profile particularly preferably comes into consideration here, that multiple periods different from one another, each having the same predefined temporal length, are to be determined. The multiple periods are advantageously determined in such a way that starting points in time of successive periods are each offset by the same duration. The temporal length of the periods is preferably longer than the mentioned duration, however, by which the starting points in time of the periods are offset. The periods thus overlap. Moreover, it is preferred if the periods are determined within a predefined range of the signal profile in which, for example, the switching point is expected. For this purpose, for example, shifting a period—which may also be referred to as a window—by a certain duration backward beginning at the predefined range of the signal profile is possible.

A minimal value and a maximal value of the signal profile and the associated points in time are then each ascertained within each period; for this purpose, a product of a difference between the maximal and minimal value and a difference between the associated points in time is ascertained. In particular, an absolute minimal and maximal value of the signal profile within the period are to be considered the minimal and maximal value. In the case of observation in a Cartesian coordinate system, the product may be viewed as an area of a rectangle in which the point of the minimal value and the point of the maximal value are diagonally opposite. The rectangle may then be viewed, for example, as a rectangle having a vertical side length which corresponds to a difference between maximal and minimal value and a horizontal side length which corresponds to a time interval between minimal and maximal value. It is ultimately irrelevant for this purpose whether all periods to be considered are previously determined and then examined with respect to the product or whether one period is initially always determined and immediately thereafter the product is determined.

In accordance with an example embodiment of the present invention, the switching point is determined on the basis of the points in time of the minimal and maximal value of the period which corresponds to a maximal value of the product or the area. The switching point is preferably determined here on the basis of a mean value, for example, an arithmetic mean value, of the points in time of the minimal and maximal value. In particular, the switching point is even determined as the mean value of the points in time of the minimal and maximal value. As has proven here, such a mean value corresponds very accurately to the point in time sought.

In practice, the switching point of a solenoid valve is often also specified via a delay in relation to the activation point, i.e., the point in time at which the voltage is applied to the solenoid coil.

The provided process having the ascertainment of certain values and a product or area thus results in a search for the greatest increase of the signal profile which also correlates with the switching point. This is in particular because the vertical side length of the rectangle, which corresponds to the difference between maximal and minimal value, supplies a particular contribution to the product. In contrast to methods using the determination of a second time derivative (or second differentiations), however, no further differentiation is necessary here, i.e., if the first time derivative of the current profile is used as the signal profile, only one differentiation of the current profile is necessary. The quality of the underlying signal is thus less impaired, which results in a more accurate result. To ascertain a positive increase of the signal profile, as results in accordance with the physical relationships upon actuation of the solenoid valve, it is additionally to be ensured that the maximal value is after the minimal value with respect to time or that only such constellations are considered.

A further advantage is that ultimately only the temporal length of the periods has to be predefined or selected as the parameter for the method. Since this is the same for all periods, essentially only one parameter to be predefined remains, which makes the method clearly simpler once again or even makes it adaptable more easily to a specific case (having a specific solenoid valve or a specific application). In the case of this temporal length of the periods, it is to be ensured that it is at most sufficiently long that the fastest increase expected in the signal profile for the switching point (which may be determined, for example, on the basis of comparative measurements or test measurements) may be covered.

As a further parameter, for example, the time interval between two successive time windows will be possible, if this is not selected in accordance with the interval of two measuring points on which the signal profile is based.

The solenoid valve is preferably used for actuating a fuel injector, for example, as a control valve. An opening point of the fuel injector may thus ultimately be concluded in turn on the basis of the shifting time.

A processing unit according to an example embodiment of the present invention, for example, a control unit of a motor vehicle, is configured, in particular by programming, to carry out a method according to the present invention.

The implementation of a method according to the present invention in the form of a computer program or a computer program product including program code for carrying out all method steps is also advantageous, since this incurs particularly low costs, in particular if an executing control unit is also used for further tasks and is therefore present in any case. Suitable data carriers for providing the computer program are in particular magnetic, optical, and electrical memories, e.g., hard drives, flash memories, EEPROMs, DVDs, etc. A download of a program via computer networks (Internet, intranet, etc.) is also possible.

Further advantages and embodiments of the present invention result from the description and the figures.

The present invention is schematically shown on the basis of an exemplary embodiment in the figures and is described hereinafter with reference to the figures.

BRIEF DESCRIPTION OF THE DRAWINGS

FIG. 2 shows a typical profile of a time derivative of a current in the solenoid coil of a solenoid valve to explain a method according to the present invention in one preferred specific embodiment.

FIG. 3 shows typical profile of variables upon actuation of a solenoid valve for better classification of the profile from FIG. 2.

DETAILED DESCRIPTION OF EXAMPLE EMBODIMENTS

Figure 1:
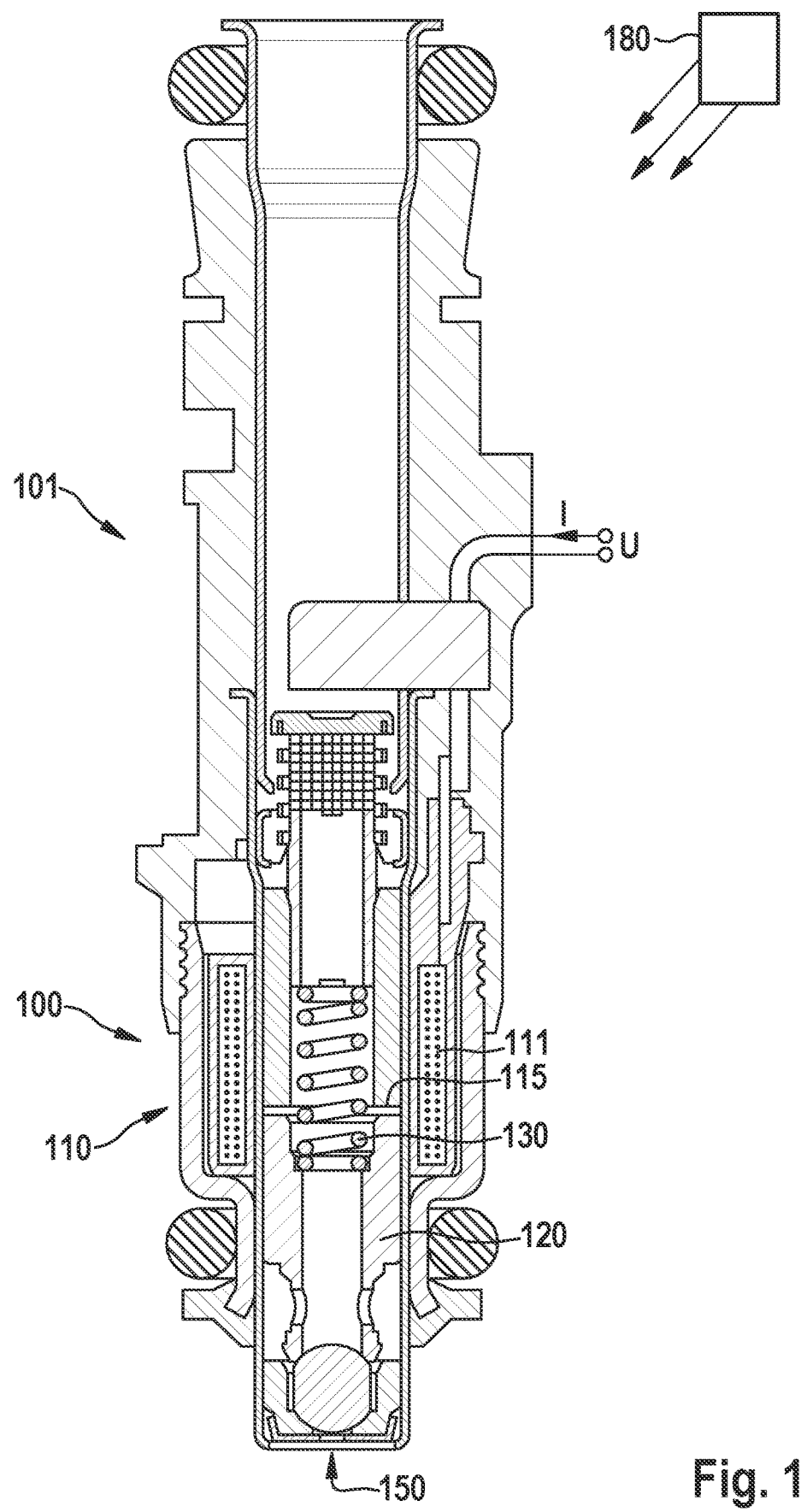
FIG. 1 schematically shows a solenoid valve in which a method according to the present invention may be carried out.

FIG. 1 schematically shows a solenoid valve 100, which is used, for example, in a fuel injector 101 and in which a method according to the present invention may be carried out. Solenoid valve 100 includes an electromagnet 110 including a solenoid coil 111, which may be designed to be annular, for example. Upon application of a voltage U, for example, by an executing processing unit 180 designed as a control unit, current I flows in solenoid coil 111.

Furthermore, a solenoid armature 120 is provided, which is moreover used as a valve needle, using which a flow opening 150 may be closed or unblocked. Furthermore, a spring 130 is provided, which engages on solenoid armature 120 and, without energization of solenoid coil 111 and thus without magnetic force, presses armature 120 into or against flow opening 150 and closes it. Spring 130 may be in contact on its side facing away from the solenoid armature at a suitable component of solenoid valve 100.

Upon energization of solenoid coil 111, a magnetic force is built up and solenoid armature 120 is raised against the spring force of spring 130 and drawn in the direction of solenoid coil 111 or electromagnet 110. Flow opening 150 is unblocked. Upon corresponding energization of the solenoid coil, solenoid armature 120 may be raised up to stop 115.

FIG. 2 shows a typical signal profile V of a time derivative of a current (or a current profile in the solenoid coil of a solenoid valve to explain a method according to the present invention in one preferred specific embodiment). For this purpose, a time derivative dI/dt is plotted over a time t. For this purpose, it is to be noted that in principle a difference dI, thus a difference between two successive measured values may be sufficient for the provided method and a scaling of the x axis is arbitrary.

In the example shown, the search for the switching point is to be carried out in the range between a starting point $t'_A$ and an end point $t'_E$ of profile V, for example, because the switching point is expected within this range. For this purpose, multiple periods (or windows or time intervals) having the same temporal length $\Delta t$ are determined. These are distributed, for example, uniformly and overlapping within range $t'_A$ through $t'_E$. For example, two such periods $T_{A,1}$ and $T_{A,2}$ are shown, which have an interval $\Delta t'$ with respect to their starting points.

In practice, signal profile V may be provided, for example, as a sequence of measuring points (or time derivatives of measuring points) in a buffer memory. For this purpose, for example, each measuring point (whose intervals result from a sampling rate) may be used as the starting point of a period. It is understood that also only every second, third, or fourth measuring point may be used for this purpose. The temporal length may then be selected as a multiple of a distance of two measuring points from one another.

A minimal value and a maximal value of the profile is now determined for each of the periods. This is to be explained hereinafter on the basis of period $T_{A,2}$. Therein, minimal value $(dI/dt)_{min}$ is at point $t_{min}$ and maxima value $(dI/dt)_{max}$ is at point $t_{max}$. Now (in the context of a calculation of the product), a rectangle R including diagonal corner points, which are defined by the signal profile points having the minimal and the maximal value, is determined, and its area $F_R$ is ascertained as the desired product.

In this way, a value of the product or area of the rectangle may be obtained for each of the periods. That period is selected as the one sought for which the value of the area is maximal.

Switching point $t_s$ is determined there on the basis of a mean value of points $t_{min}$ and $t_{max}$.

In this way, the switching point may be found easily and accurately without forming a second time derivative or without two differentiations of the underlying signal of the current profile, but without having to accept an excessively strong impairment of the quality of the signal.

FIG. 3 shows typical profiles of variables upon actuation of a solenoid valve over time t for better classification of the curve from FIG. 2, specifically over a longer time frame. In addition to signal profile V from FIG. 2, (which indicates dI/dt), these are a voltage profile U as an activation signal of the solenoid valve or its solenoid coil, a current profile I in the solenoid coil, a lift profile h of a valve needle of the solenoid valve, and a profile $F_R$ of the product or area as was explained with reference to FIG. 2.

Curve $F_R$ corresponds to a profile of the product when the periods are passed through along the x axis or are shifted temporally backward. It may be seen here that the greatest value of the product very accurately indicates switching point $t_s$ of the solenoid valve, which ultimately corresponds accurately with reaching the greatest lift.

What is claimed is:

1. A method for determining a switching point of a solenoid valve, in which a solenoid coil is energized to raise a solenoid armature to unblock a flow opening, the method comprising the following steps:
determining, for a signal profile characteristic of a current profile in the solenoid coil, multiple periods each different from one another and each having the same predefined temporal length;
ascertaining, within each period of the periods, a minimal and a maximal value of the signal profile and associated points in time;
ascertaining a product of a difference between the maximal and minimal value and a difference between the associated points in time; and
determining the switching point based on the associated points in time of the minimal and maximal value of that period of the periods which corresponds to the maximal value of the product.

2. The method as recited in claim 1, wherein the switching point is determined on based on an arithmetic mean value of the points in time of the minimal and maximal value.

3. The method as recited in claim 2, wherein the switching point is determined as the arithmetic mean value of the points in time of the minimal and maximal value.

4. The method as recited in claim 1, wherein a first time derivative of the current profile is used as the signal profile characteristic for the current profile.

5. The method as recited in claim 1, wherein the multiple periods are determined in such a way that starting points of successive periods are each offset by the same duration.

6. The method as recited in claim 5, wherein the predefined temporal length is a multiple of the duration.

7. The method as recited in claim 1, wherein the periods are determined within a predefined range of the signal profile.

8. The method as recited in claim 1, wherein the solenoid valve is used to actuate a fuel injector.

9. A processing unit configured to determine a switching point of a solenoid valve, in which a solenoid coil is energized to raise a solenoid armature to unblock a flow opening, the method comprising the following steps:
determine, for a signal profile characteristic of a current profile in the solenoid coil, multiple periods each different from one another and each having the same predefined temporal length;
ascertain, within each period of the periods, a minimal and a maximal value of the signal profile and associated points in time;
ascertain a product of a difference between the maximal and minimal value and a difference between the associated points in time; and
determine the switching point based on the associated points in time of the minimal and maximal value of that period of the periods which corresponds to the maximal value of the product.

10. A non-transitory machine-readable memory medium on which is stored a computer program for determining a switching point of a solenoid valve, in which a solenoid coil is energized to raise a solenoid armature to unblock a flow opening, the computer program, when executed by a processing unit, causing the processing unit to perform the following steps:
determining, for a signal profile characteristic of a current profile in the solenoid coil, multiple periods each different from one another and each having the same predefined temporal length;
ascertaining, within each period of the periods, a minimal and a maximal value of the signal profile and associated points in time;
ascertaining a product of a difference between the maximal and minimal value and a difference between the associated points in time; and
determining the switching point based on the associated points in time of the minimal and maximal value of that period of the periods which corresponds to the maximal value of the product.

* * * * *